United States Patent
Lou et al.

(10) Patent No.: US 9,253,714 B2
(45) Date of Patent: Feb. 2, 2016

(54) SCHEDULING PRIORITIZED NETWORK SEARCHES FOR A MULTI-MODE COMMUNICATION DEVICE

(71) Applicant: Apple Inc., Cupertino, CA (US)

(72) Inventors: Wenping Lou, Beijing (CN); Wen Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 14/018,326

(22) Filed: Sep. 4, 2013

(65) Prior Publication Data

US 2014/0066061 A1 Mar. 6, 2014

Related U.S. Application Data

(60) Provisional application No. 61/696,737, filed on Sep. 4, 2012.

(51) Int. Cl.
*H04W 48/16* (2009.01)
(52) U.S. Cl.
CPC ..................................... *H04W 48/16* (2013.01)
(58) Field of Classification Search
CPC ..... H04W 48/16; H04W 48/18; H04W 48/20; H04W 88/02; H04W 4/02; H04W 88/06
USPC ............. 455/434, 422.1, 63.2, 450, 524, 525, 455/62, 161.1, 423, 424, 425, 426.1, 426.2, 455/436, 432.2, 432.3, 433, 435.1, 444, 455/435.2, 435.3; 370/329, 350, 208, 315, 370/319, 341, 342, 331, 332, 235, 236
See application file for complete search history.

(56) References Cited

U.S. PATENT DOCUMENTS

| | | | |
|---|---|---|---|
| 6,223,042 B1 | 4/2001 | Raffel | |
| 7,379,748 B2 | 5/2008 | Jansen | |
| 2008/0198811 A1 | 8/2008 | Deshpande et al. | |
| 2008/0220772 A1* | 9/2008 | Islam et al. | 455/432.2 |
| 2009/0036098 A1* | 2/2009 | Lee et al. | 455/411 |
| 2009/0298437 A1* | 12/2009 | Hoefel et al. | 455/67.11 |
| 2010/0020725 A1* | 1/2010 | Ha et al. | 370/255 |
| 2012/0077494 A1* | 3/2012 | Kim et al. | 455/435.1 |
| 2012/0184269 A1 | 7/2012 | Wilhelmsson et al. | |

FOREIGN PATENT DOCUMENTS

EP 1928195 8/2012

* cited by examiner

*Primary Examiner* — Christopher M Brandt
(74) *Attorney, Agent, or Firm* — Downey Brand LLP

(57) ABSTRACT

A multi-mode communication device having a scan optimizer capable of prioritizing scan frequencies for different radio access technologies (RATs) during a network search. The scan frequency prioritization may be based on various network coverage considerations associated with RAT availability, RAT density within a region, geographic location, historic attachment for the multi-mode device, an operation mode of the multi-mode device, etc. The multimode device can utilize its scan optimizer to generate an optimized scan schedule to be employed for a limited duration during a network search to improve its likelihood of success in detecting and/or attaching to a network associated with a prioritized RAT. A default scan schedule having equal scan frequency prioritization can be employed by the multi-mode device at a time when the limited duration of the optimized scan schedule expires and no networks associated with a prioritized RAT have been acquired.

18 Claims, 9 Drawing Sheets

SCHEDULING PRIORITIZED NETWORK SEARCHES FOR A MULTI-MODE COMMUNICATION DEVICE

CROSS-REFERENCE TO RELATED APPLICATIONS

This application claims priority to U.S. Provisional Patent Application No. 61/696,737, filed on Sep. 4, 2012, the content of which is incorporated herein by reference in its entirety.

FIELD OF THE TECHNOLOGY

The described embodiments generally relate to wireless communications and more particularly to generating a network scan schedule for a multi-mode communication device that is capable of communicating over a wireless network using multiple, distinct radio access technologies (RATs).

BACKGROUND

Fourth generation (4G) cellular networks employing newer radio access technology (RAT) systems that implement the $3^{rd}$ Generation Partnership Project (3GPP) Long Term Evolution (LIE) and LTE Advanced standards are rapidly being developed and deployed within the United States and abroad. However, the lion's share of modern, deployed cellular networks are not 4G. For instance, the majority of deployed cellular networks in the Americas are associated with various combinations of third generation (3G) legacy networks and second generation (2G) legacy networks, which respectively employ a number of different RATs.

In addition to LTE network deployments at a particular geographic location, existing legacy cellular networks may also be deployed within the same overlapping coverage area or geographic region. Older legacy networks, which have not been completely outmoded, may be associated with any number of 3G or 2G legacy RATs, such as those associated with 3G Universal Mobile Telecommunications System (UMTS)/High Speed Packet Access (HSPA) systems, 3G Code Division Multiple Access (CDMA) 2000/1x Evolution-Data Only (EV-DO) systems, as well as, 2G Global System for Mobile Communications (GSM)/Enhanced Data Rate for GSM Evolution (EDGE) systems.

Further, modern wireless communication devices are being manufactured as multi-mode devices that are capable of communicating within these heterogeneous network topologies using multiple RATs, as needed. The term "multi-mode" generally refers to a device's ability to communicate using more than one 4G, 3G, or 2G RAT. By way of example, many multi-mode devices are configured to include multiple modems and/or transceivers that enable the devices to communicate using 4G LTE networks, as well as to communicate using various 3G and/or 2G legacy networks.

When a multi-mode communication device attempts to search for an available network at its present geographic location, the device may scan various frequency spectra resources that are associated with different compliant RATs for the device, i.e., by looping though its different communication modes. For example, an LTE-enabled device also having 3G and 2G communications capability can scan through several distinct frequency bands associated with each RAT type during a network search procedure. These multi-RAT network scans can be repeated until a network is ultimately acquired.

Unfortunately, device resources are often wasted during network scans due to many network considerations that modern multi-mode communication devices do not evaluate while performing network scans and acquisition. Accordingly, there remains a need for generating a network scan schedule for a multi-mode communication device that can account for various network coverage considerations to reduce unnecessary network scans during network searches.

SUMMARY OF DESCRIBED EMBODIMENTS

Some embodiments disclosed herein provide for scheduling an optimized network search at a multi-mode communication device to improve a likelihood of success for detecting and acquiring a wireless network associated with one or more different radio access technologies (RATs) that the multi-mode device is compliant with. For instance, the multi-mode device may have any number of modems and/or transceivers which it can utilize to establish communications via different RATs that are associated with different allocated frequency spectra.

In this regard, the multi-mode communication device may be capable of identifying various network coverage considerations associated with RAT availability, RAT density within a particular region, geographic location, historic attachment for the multi-mode communication device, and/or an operation mode of the multi-mode device. In some scenarios, the multi-mode device can utilize its scan optimizer to generate an optimized scan schedule having information associated with different frequency resources to be scanned during a network search, based on the identified network coverage considerations. While employing the optimized scan schedule, the multi-mode device may scan a first frequency of the different frequency resources more often than a second frequency of the different frequency resources during a first scanning interval of the network search.

In some embodiments, the first frequency may be associated with a first radio access technology (RAT), e.g., fourth generation (4G) Long Term Evolution (LTE) or LTE Advanced, and in some embodiments, the second frequency may be associated with a second RAT, e.g., a third generation (3G) legacy RAT that is associated with Universal Mobile Telecommunications System (UMTS) or Code Division Multiple Access 2K (CDMA 2000).

In one aspect of the disclosure, the optimized scan schedule may be generated in response to determining that the multi-mode device has disconnected from a wireless network associated with the first RAT. In this scenario, the multi-mode communication device can attempt to reacquire the wireless network associated with the first RAT by prioritizing scanning of the first frequency over other available frequencies resources, including the second frequency.

In accordance with another aspect, the optimized scan schedule may be generated in response to determining that the multi-mode device is not presently registered with a particular wireless network. In this scenario, the multi-mode communication device can attempt to acquire a wireless network associated with the first RAT by prioritizing scanning of the first frequency over other available frequency resources, including the second frequency.

In some implementations, a third frequency that may be associated with a third RAT, e.g., a second generation (2G) legacy RAT associated with Global Systems for Mobile (GSM), can be scanned more often than the second frequency associated with the second RAT during the first scanning interval of the network search based in part on the identified network coverage considerations.

In some embodiments, in accordance with an optimized scan schedule, the first frequency may be scanned more often than a third frequency that is associated with a third RAT, e.g., a second generation (2G) legacy RAT associated with Global Systems for Mobile (GSM), during the first scanning interval of the network search based in part on various identified network coverage considerations.

In accordance with some aspects of the disclosure, the optimized scan schedule may be employed during a limited time duration of the first scanning interval based on a timing relevance of the identified one or more network coverage considerations. The timing relevance may be related to a known or predicted period of time when the multi-mode device can expect to detect particular RATs at a specific geographic location or region.

In one aspect, the multi-mode communication device can utilize a default scan schedule instead of the optimized scan schedule in response to determining or learning that the limited time duration of the first scanning interval has expired. In various embodiments, the default scan schedule may enable the multi-mode device to scan two or more frequency resources equally, such that they have equivalent scanning prioritization during a second scanning interval of the network search. Accordingly, the first scanning interval may be associated with a period of time during which the optimized scan schedule is to be employed during a network search, and the second scanning interval may be associated with a period of time during which the default scan schedule is to be employed during the network search.

In accordance with various embodiments, the multi-mode communication device can be composed of multiple hardware and software components, including, but not limited to one or more transceivers that can be associated with multiple radio access technologies (RATs), and processing circuitry coupled to the transceiver(s), as well as memory, e.g., any common volatile or non-volatile memory type, coupled to the processing circuitry.

In some implementations, the processing circuitry may be configured to execute computer program instructions to cause the multi-mode device to generate a prioritized scan schedule (e.g., the multi-mode device can utilize a scan optimizer to generate the prioritized scan schedule for multiple RATs) including information associated with multiple frequency resources to be scanned during a network search based on various network coverage considerations, and in accordance with the prioritized scan schedule, scan multiple, distinct frequency resources to attempt to acquire a first high priority network associated with a first RAT, e.g., a RAT associated with fourth generation (4G) Long Term Evolution (LTE) or LTE Advanced, before attempting to acquire a lower priority network associated with a second RAT, e.g., a third generation (3G) legacy RAT that is associated with Universal Mobile Telecommunications System (UMTS) or Code Division Multiple Access 2K (CDMA 2000), during the network search.

In accordance with some aspects of the disclosure, the multi-mode communication device may employ its transceiver(s) that are respectively associated with distinct RAT types, in accordance with a prioritized scan schedule to scan frequency resources associated with the first high priority network more often than it scans for frequency resources associated with the lower priority network.

In some embodiments, the prioritized scan schedule can be utilized during a first portion of the network search for a limited time duration that corresponds to a relevance of various network coverage considerations associated with RAT density within a region, geographic location, and an operation mode of the multi-mode communication device.

In some implementations, in accordance with a prioritized scan schedule, the multi-mode device may scan the frequency resources to attempt to acquire a second high priority network associated with a third RAT before it attempts to acquire the lower priority network associated with a second RAT during the network search. Further, the multi-mode device may scan the frequency resources to attempt to acquire the first high priority network associated with the first RAT before it attempts to acquire the second high priority network associated with the third RAT during the network search.

In various embodiments, a non-transitory computer-readable storage medium, can store a set of computer program instructions, that when executed by one or more processors of a multi-mode communication device, may cause the multi-mode communication device to generate a prioritized scan schedule including information associated with various frequency resources to be scanned during a network search based in part on one or more network coverage considerations. The execution of the computer program instructions may further cause the multi-mode device to scan multiple, distinct frequency resources, in accordance with the generated prioritized scan schedule, to attempt to acquire a high priority network associated with a first RAT before it attempts to acquire a lower priority network associated with a second RAT during the network search.

In various embodiments, after the multi-mode communications device detects a network, in accordance with a network search that is based on an optimized scan schedule or a prioritized scan schedule, the multi-mode device can connect to the found network to acquire network service, without unnecessarily wasting device resources as would be the case in a related scenario where a network search was performed utilizing a default network scan schedule that is not prioritized.

The above summary is provided to elucidate certain example embodiments that describe distinct aspects of the disclosure. Accordingly, it should be understood that the above summary should not be construed as narrowing the scope of the ensuing claims in any way. Other aspects and advantages of the summarized embodiments will become apparent from the following description taken in conjunction with the accompanying drawings, which are intended to depict fundamental principles that are described in further detail in the ensuing disclosure.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
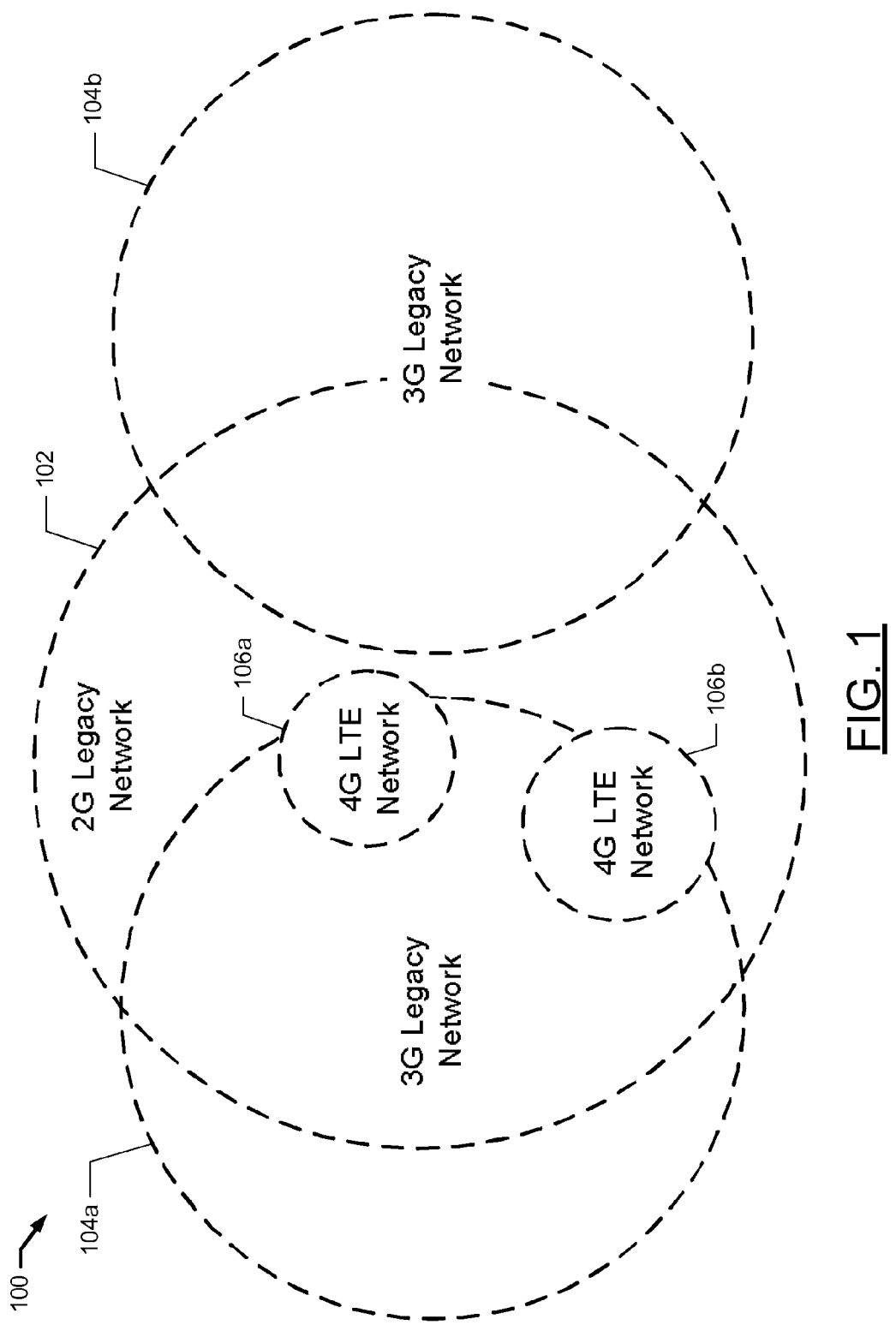
FIG. 1 illustrates a heterogeneous network topology of overlapping wireless network coverage areas including fourth generation (4G) LTE networks, third generation (3G) legacy networks, and second generation (2G) legacy networks in accordance with some embodiments.

Representative examples and applications for generating optimized or prioritized network scan schedules and for performing corresponding network search and acquisition procedures, as well as the corresponding apparatuses, are described within this section. These examples are provided to add context to, and to aid in the understanding of, the subject matter of this disclosure. It should be apparent to one having ordinary skill in the art that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

References are made in this section to the accompanying figures, which form a part of the disclosure and in which are shown, by way of illustration, various implementations corresponding to the described embodiments herein. Although the embodiments are described in sufficient detail to enable one skilled in the art to practice the described embodiments, it should be understood that these examples are not to be construed as being overly-limiting or all-inclusive.

In accordance with various embodiments, the term "multi-mode communication device" may be used herein to describe one of any number of common consumer electronic communication devices, including, but not limited to: cellular phones or smart phones, tablet computers, laptop computers or netbook computers, media player devices, electronic book devices, MiFi® devices, as well as any other type of electronic computing device having wireless communication capabilities that can allow the multi-mode device to search for, detect, attach to, and communicate using, any number of different cellular communication networks associated with any common radio access technology (RAT) type.

Additionally, some embodiments may describe multi-mode wireless communication devices that are capable of communicating via multiple, different fourth generation (4G), third generation (3G), and/or second generation (2G) RATs. These multi-mode devices are typically configured to prefer attachment to more robust networks offering faster data rates (i.e., higher throughput networks), as compared to lower throughput legacy networks that may be outmoded in certain geographic areas, such as within various metropolitan regions. However, preference for higher RAT throughput may be only one of many considerations that can be evaluated at a time when the multi-mode device attempts to detect, e.g., by scanning frequency resources for, and acquire a wireless communications network at its then-present location.

For example, in some implementations, a multi-mode communication device may consider and evaluate various network coverage considerations, including, but not limited to RAT availability, RAT density within a region, geographic location, historic attachment for the multi-mode communication device, an operation mode of the multi-mode communication device, etc. for the purpose of generating an optimized scan schedule, which is also referred to herein as a prioritized scan schedule.

With respect to RAT availability, the multi-mode communication device may learn, e.g., by making various network signal strength and/or quality metric measurements, have stored in a device memory, or obtain from a network service provider entity, information indicating or identifying what RATs are available to the multi-mode device at a particular time and/or network location. For instance, during various times of a day, days of a week, months of a year, etc., network resources may be burdened, e.g., via congestion occurring during peak loading periods, to a level where these network resources should be considered to be unavailable for communicating data associated with certain types of network traffic, e.g., time-sensitive Internet protocol (IP) data transfers.

Additionally, RAT availability may also be associated with known network deployments within metropolitan and urban coverage areas. For example, LTE networks may be considered to be unavailable to a multi-mode device when the device is located within a network region not provisioned with any, or provisioned with insufficient, LIE cell coverage to service the communication requests of the multi-mode device. In these scenarios, the multi-mode device does not need to search for an unavailable network associated with a particular RAT type.

With respect to RAT density, the multi-mode communication device may learn, e.g., by making various network signal strength and/or quality metric measurements, have stored in a device memory, or obtain from a network service provider entity, information indicating or identifying RAT density in a particular network region. For instance, various metropolitan networks may have a substantial density of high throughput RATs associated with 4G LTE and/or other robust 3G legacy networks, e.g., Evolved High Speed Packet Access (HSPA+) networks or Code Division Multiple Access (CDMA) 2000 Evolution-Data Only (EV-DO) networks.

Conversely, various urban and suburban areas may have no 4G LTE networks or networks that may only be interspersed with more robust 3G legacy networks. In these situations, the multi-mode communication device may be able to limit searching for less available RATs based on known RAT densities. In this manner, the multi-mode device may prudently focus its search efforts on scanning for more available networks, e.g., for 4G LTE networks in metropolitan regions, or for 2G global systems for mobile (GSM) networks in urban areas.

A multi-mode communication device may further be able to identify its present geographic location, such as by using a global positioning system (GPS), by employing common triangulation techniques, by evaluating network cell attachment identifications, etc. Likewise, the multi-mode communication device may be provided with its geographic location by a serving network cell or some other network service provider entity. In either scenario, the multi-mode communication device may be able to reference a network coverage mapping or listing to determine which RAT types are accessible to it at its determined geographic location. In some scenarios, a geographic location may correspond to a particular country, i.e., while roaming abroad, a particular state, a city, a municipality, a metropolitan region, etc. that may have independent network coverage deployments which are characterized by their employed RATs.

With respect to the multi-mode communication device's historic network attachment, there can be a preference for the multi-mode device to attempt to reattach to a previously attached to network. In some scenarios, a previously attached to network may be a network that is proprietary to the multi-mode device or to an affiliated service provider, i.e., the multi-mode communication device's carrier. For example, in some implementations, the multi-mode device may have several cellular network attachment options which may be associated with overlapping network cells that are each associated with an independent high throughput RAT.

In this situation, it may be beneficial for the multi-mode device to identify network cells by historic attachment records that could also provide the device with other valuable information relating to past communications performance. All things being equal, the multi-mode device could benefit from identifying and reattaching to a better performing network e.g., a network deemed to be more stable than other networks within a particular coverage area, or to a network that is associated with its carrier, e.g., while the multi-mode device is roaming, when it may be more expensive to communicate using non-roaming partner networks.

Additionally, the operation mode of the multi-mode communication device may also be considered for the purpose of generating an optimized scan schedule, such as in situations where the multi-mode device may be determined to be in a connected mode, an idle mode, a sleep mode, a registered or unregistered mode, e.g., where the device may or may not be registered with a particular service provider, etc. Depending on the multi-mode device's operation mode, there may be an advantage for prioritizing network scanning activities in such a manner that the multi-mode device could elect to more frequently attempt to detect some networks over others.

FIG. 1 depicts overlapping multi-RAT coverage areas for a heterogeneous network topology 100, in accordance with various embodiments described further herein. In some scenarios, a multi-mode communication device 204 (depicted in FIG. 2) may be travelling between and amongst different geographic regions of the heterogeneous network topology 100 at a time when the multi-mode device needs to detect and acquire a wireless communications network. In accordance with some embodiments, the different RAT coverage areas of the heterogeneous network topology 100 may be associated with one or more 4G cellular networks 106a-b employing LIE and/or LIE Advanced networks, one or more 3G legacy networks 104a-b employing Universal Mobile Telecommunications System (UMTS) networks or one or more CDMA 2000 networks, as well as, one or more 2G legacy networks 102 employing GSM networks.

The 4G LTE networks 106a-b, the 3G legacy networks 104a-b, and the 2G legacy networks 102 can each have corresponding regions of wireless coverage that are represented by the respective dashed circles depicted in FIG. 1. The multi-RAT coverage areas 106a-b, 104a-b, and 102, of the heterogeneous network topology 100 can overlap with one another, in such a manner that that coverage areas 106a-b associated with various LTE femtocells may be encompassed by one or more overarching 3G and 2G legacy network coverage areas 104a-b and 102 that may be associated with either legacy microcells and/or legacy macrocells.

In various implementations, a multi-mode communication device 204 may be configured to communicate via any of the 4G LTE networks 106a-b in conjunction with, or in isolation from, any of the 3G and 2G legacy networks 104a-b and 102. By way of example, when the multi-mode communication device 204 is located within a particular geographic region having overlapping wireless coverage, the multi-mode communication device 204 can be configured to readily scan for and attach to any of the multiple, different available RATs of the heterogeneous network topology 100, in accordance with an optimized scan schedule having a designated RAT prioritization. In some embodiments, the multi-mode communication device 204 can generate an optimized scan schedule with which it may utilize to perform one or more prioritized network scans in response to a particular network disassociation event, or alternatively, in response to determining the multi-mode communication device 204 to be in an unregistered mode (e.g., when the multi-mode communication device 204 is not registered with a particular carrier).

In some implementations, the multi-mode communication device 204 may perform one or more prioritized network searches, in accordance with a prioritized scan schedule, to selectively scan a select radio frequency or a subset of radio frequencies (or frequency bands) associated with a prioritized RAT or RATs, more frequently than it scans for a select radio frequency or a subset of radio frequencies associated with another RAT or RATs having lower scan priority. In various embodiments, the multi-mode communication device 204 can employ a scan optimizer 314 to evaluate various network coverage considerations in an effort to identify information that it can evaluate to determine a particular RAT scan priority for generating the optimized scan schedule. In some scenarios, the multi-mode communication device 204 may perform a network search utilizing the optimized scan schedule to detect and attach to a wireless communications network employing a preferred RAT.

Figure 2:
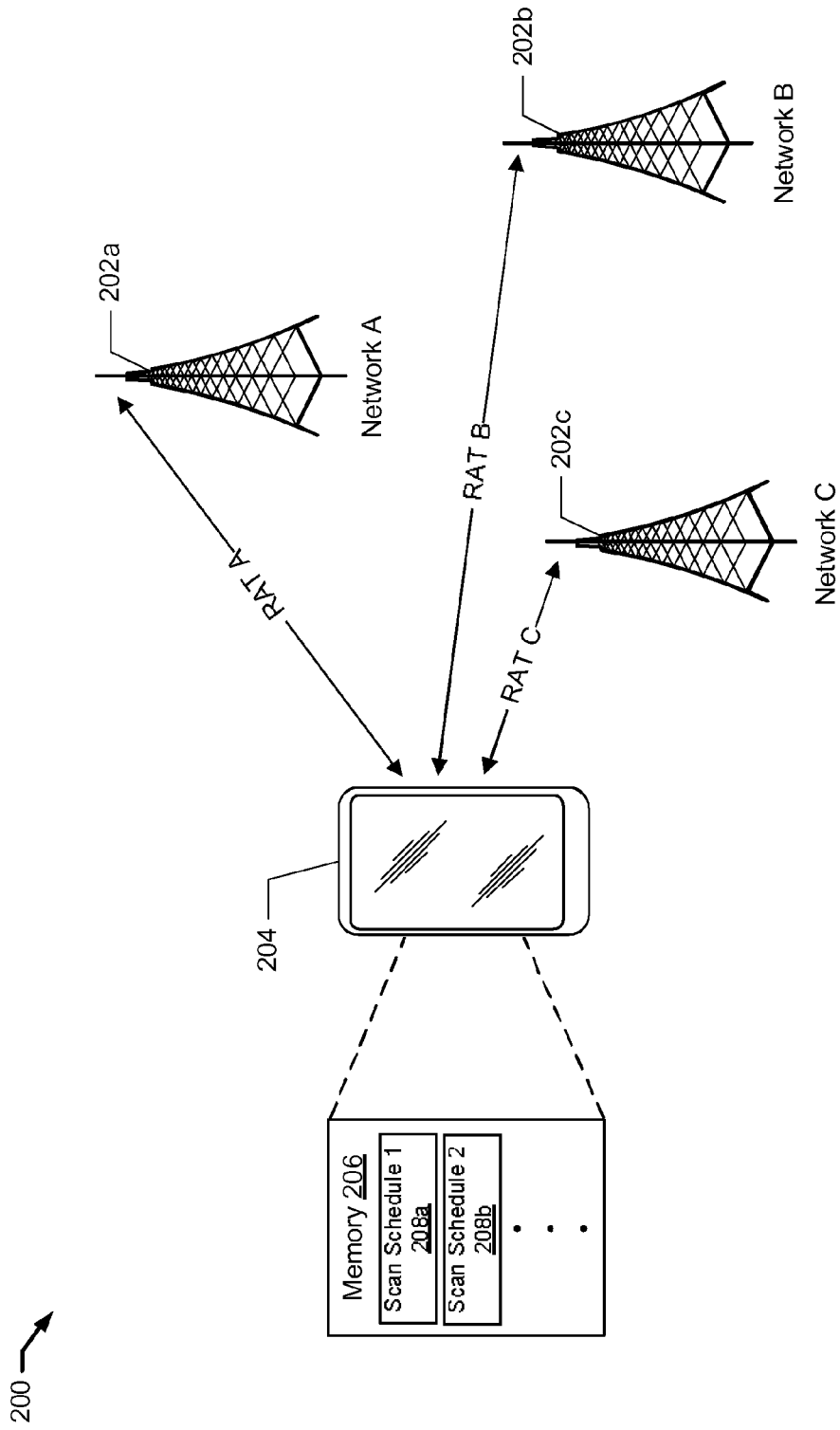
FIG. 2 illustrates a wireless communication system including a wireless communication device having multiple network scan schedules stored in a device memory, in accordance with some implementations.

FIG. 2 depicts a wireless communication system 200 including a wireless multi-mode communication device 204 having various network scan schedules 208a-b stored in a device memory 206, in accordance with some implementations. It should be understood that the network scan schedules 208a-b may correspond to any of the device-generated optimized scan schedules 700 and 800 depicted in FIGS. 7 and 8, or to the default scan schedule 600 depicted in FIG. 6. The wireless communication system 200 also includes multiple network base stations that may correspond to: a first base station 202a associated with a first network, Network A, that employs a first RAT type, RAT A, a second base station 202b associated with a second network, Network B, that employs a second RAT type, RAT B, and a third base station 202c associated with a third network, Network C, that employs a third RAT type, RAT C.

In accordance with various embodiments, any of Networks A, B, or C may be respectively associated with the multi-mode communication device's 204 home network, a preferred roaming partner of the multi-mode device's carrier, or a non-affiliated roaming network. Further, any of RATs A, B, and C, may correspond to a 4G LTE RAT, or a 3G or 2G legacy RAT, such as those described above with respect to the heterogeneous network topology 100 of FIG. 1.

As illustrated in FIG. 2, the multi-mode communication device 204 can be positioned within a defined signaling range of each of the three base stations 202a-c. In this regard, the multi-mode device 204 may be located in a region of overlapping coverage that is respectively associated with each of RATs A, B, and C. In some embodiments, the multi-mode communication device 204 may employ a default scan schedule 600 (depicted in FIG. 6) with which it can utilize to search for each of Networks A, B, and C. In one scenario, the first base station 202a can provide wireless communications coverage for Network A, which may be associated with a 4G LTE network. In the same scenario, the second network base station 202b may provide wireless communication coverage for Network B, which may be associated with a 3G UMTS or a 3G CDMA 2000 network, and the third network base station 202c may provide wireless communication coverage for Network C, which may be associated with a 2G GSM network.

As would be understood by those skilled in the art, different carriers operate on different licensed frequency spectra. Further, different RATs operate within different designated frequency bands. Accordingly the multi-mode communication device 204 may need to scan several different frequencies and/or frequency bands during a network search while attempting to detect each of Networks A, B, and C. This multi-RAT scan procedure can be looped or repeated until a preferred network is detected and acquired. Accordingly, depending on the number of required scanning repetitions, an inefficient scan schedule can significantly delay a network search, while at the same time wasting valuable device resources, e.g., battery power, device, memory resources, and processor resources availability. It is therefore desirable to be able to prioritize a scan schedule to be employed during a network search, in accordance with the network coverage considerations described above, to conserve device resources and reduce scan times.

Figure 3:
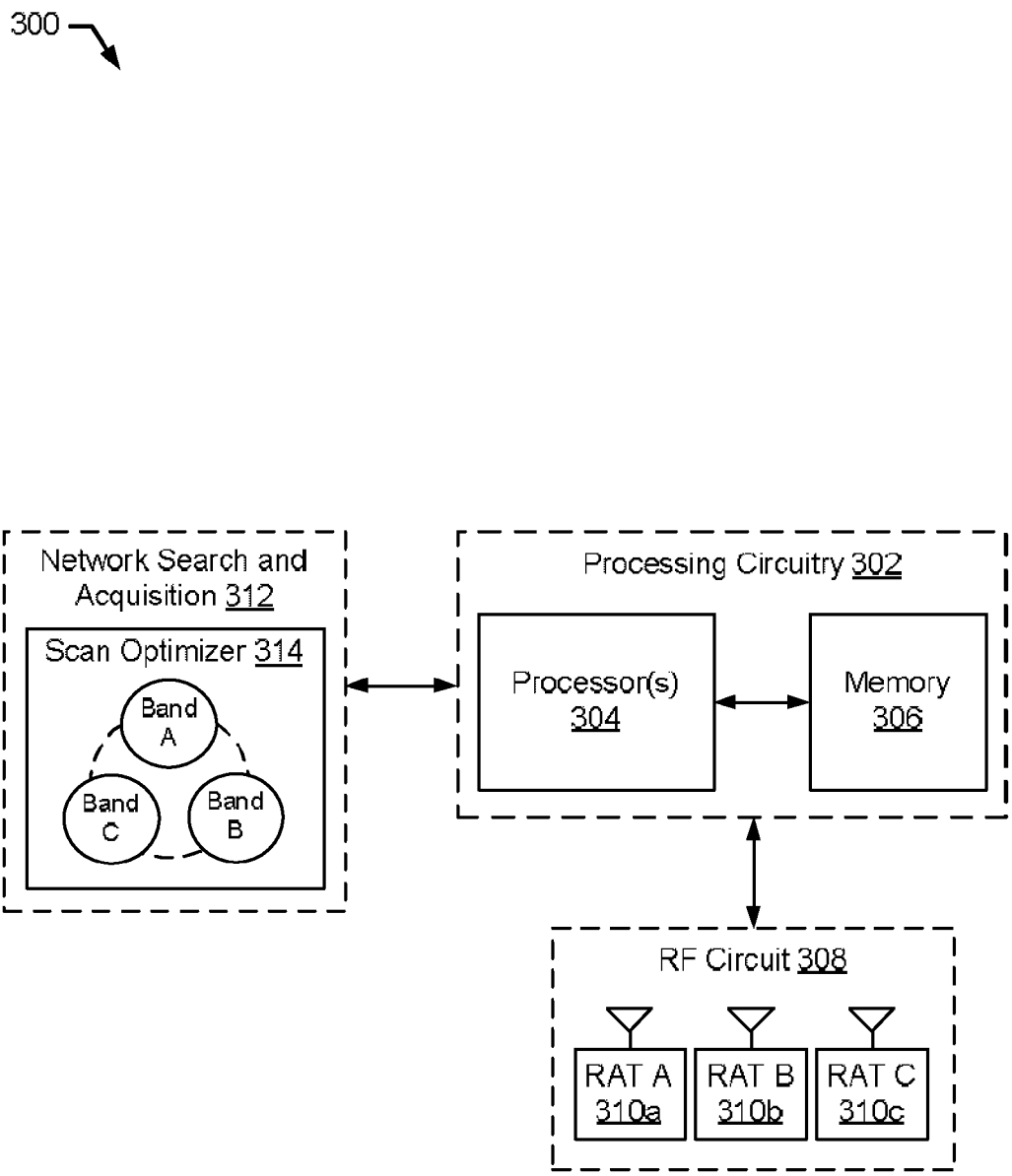
FIG. 3 illustrates a block diagram of an apparatus including a network search and acquisition module employing a scan optimizer that can perform network search and acquisition procedures in accordance with various embodiments of the disclosure.

FIG. 3 illustrates a block diagram of an apparatus 300 including a network search and acquisition module 312 that employs a scan optimizer 314 component that can be configured to evaluate various network coverage considerations, e.g., RAT availability, RAT density within a region, geographic location, historic attachment for the multi-mode communication device, an operation mode of the multi-mode communication device, etc., in order to generate an optimized, prioritized scan schedule. The scan optimizer 314 may generate an optimized scan schedule in accordance with various embodiments of the disclosure, such as in accordance with any of the scan schedule generation procedures 400, 500, and 900 respectively depicted in FIGS. 4, 5, and 9, which are described in further detail herein.

It should be understood that the apparatus 300 depicted in FIG. 3 may be implemented at a multi-mode wireless communication device 204 in accordance with various embodiments. In this regard, when implemented as a mobile computing device, such as a multi-mode communication device 204, apparatus 300 may operate within the wireless communication system 200 in accordance with one or more embodiments. It should also be appreciated that not all of the components, device elements, and hardware illustrated in and described with respect to FIG. 3 may be essential to the disclosure, and thus, some of these items may be omitted, consolidated, or otherwise modified. Additionally, in some implementations, this subject matter associated with apparatus 300 can include additional or substitute components, device elements, or hardware, beyond those illustrated in, and described with respect to FIG. 3.

In some configurations, the apparatus 300 can include processing circuitry 302 that is configurable to perform actions in accordance with one or more example embodiments disclosed herein. In this regard, the processing circuitry 302 can be configured to perform and/or control performance of one or more functionalities of the apparatus 300 in accordance with various example embodiments, and thus can provide various instrumentalities for performing network coverage consideration evaluations, scan schedule generations, frequency resource scanning, and other communication procedures of the apparatus 300 in accordance with various embodiments. The processing circuitry 302 may be configured to perform data processing, application execution and/or other control and management functions according to one or more example embodiments.

In some implementations, the apparatus 300 or portions or components thereof, such as the processing circuitry 302, can include one or more chipsets, which can respectively include one or more coupled microchips thereon. The processing circuitry 302 and/or one or more other components of the apparatus 300 can therefore, in some instances, be configured to implement functions associated with various procedures of the disclosure using one or multiple chips or chipsets. In some example embodiments, where one or more components of the apparatus 300 are embodied as or within a chipset, the corresponding chipset may be capable of enabling a multi-mode communication device 204 to operate within the wireless communication system 200, when implemented, or otherwise operably coupled to, the multi-mode communication device 204. Thus, for example, one or more components of the apparatus 300 may provide a chipset configured to enable the multi-mode communication device 204 to operate over one or more 4G LTE networks 106a-b, 3G legacy networks 104a-b, and/or 2G legacy networks 102, as depicted in FIG. 1.

In some example scenarios, the processing circuitry 302 can include one or more processors 304 and, in some embodiments, such as that illustrated in FIG. 3, can further include a memory or memories 306. In various embodiments, the processing circuitry 302 may be in communication with, or otherwise coupled to, a radio frequency (RF) circuit 308 and a network search and acquisition module 312. In some scenarios, the RF circuit 308 may include one or multiple modems and/or transceivers 310a-c that may be respectively configured to communicate using different RAT types. For instance, transceiver 310a may be configured to operate using RAT A, which may be different from RATs B and C. Likewise, transceiver 310b may be configured to operate using RAT B, which may be different from RATs A and C, and transceiver 310c may be configured to operate using RAT C, which may be different from RATs A and B. In this configuration, the RF circuit 208 can operate in multiple, different RAT modes. Further, it should be understood that the RF circuit 208 may be capable for performing various multi-RAT scanning procedures associated with various embodiments of the disclosure, which will be described further herein.

In some embodiments, the network search and acquisition module 312 may be configured to employ the scan optimizer 314 to evaluate various network coverage considerations that may be associated with any of, but not limited to, RAT availability, RAT density within a region, geographic location, historic attachment for the multi-mode communication device, an operation mode of the multi-mode communication device, etc. for the purpose of generating an optimized scan schedule. In various implementations, the apparatus 300 may learn, e.g., by making various network signal strength and/or quality metric measurements, have stored in a device memory 306, or obtain from a network service provider entity, information relating to the various network coverage considerations described herein.

In an embodiment, the scan optimizer 314 may evaluate acquired network coverage considerations to prioritize various frequency resources or frequency bands for scanning during a network search. In this regard, the scan optimizer 314 may be configured to prioritize select frequency bands, e.g., any of Bands A, B, and C, associated with RATs A, B, and C, over other bands for the purpose of generating an optimized scan schedule to be utilized by a multi-mode communication device 204 during a network search. In various embodiments, the generation of an optimized scan schedule may occur in response to a detection of a particular operation mode of a multi-mode device 204, such as a connected mode, an idle mode, a sleep mode, a registered or unregistered mode, etc.

In some implementations, the processor(s) 304 may be embodied in a variety of forms. For example, the processor(s) 304 can be embodied as a microprocessor, a coprocessor, a controller, or various other computing or processing implements, including integrated circuits such as, for example, an ASIC (application specific integrated circuit), an FPGA (field programmable gate array), or some combination thereof. In various embodiments, multiple processors 304 can be coupled to and/or in operative communication with each other and these components may be collectively configured to perform one or more procedures of the apparatus 300 as described herein in the form of a multi-mode communication device 204.

In some implementations, the processors 304 can be configured to execute instructions that may be stored in the memory 306 or that can be otherwise accessible to the processors 304 in some other device memory. As such, whether configured as, or in conjunction with, hardware or a combination of hardware and software, the processors 304 may be capable of performing operations according to various implementations described herein when configured accordingly.

In various embodiments, the memory 306 may include multiple memory devices that may be of a common volatile or a non-volatile memory type. Memory 306 can include fixed and/or removable memory type devices. In some scenarios, the memory 306 can be associated with a non-transitory computer-readable storage medium that can store various computer program instructions that may be executed by the processor(s) 304 of the processing circuitry 302 during normal program executions. In this regard, the memory 306 can be configured to store information (e.g., acquired network coverage consideration information), data, applications, instructions, or the like, for enabling the apparatus 300 to carry out various functions in accordance with one or more embodiments of the disclosure. In some implementations, the memory 306 may be in communication with, and coupled to, the processor(s) 304 of the processing circuitry 302 and one or more system buses for passing information between and amongst the different device components of the apparatus 300.

Figure 4:
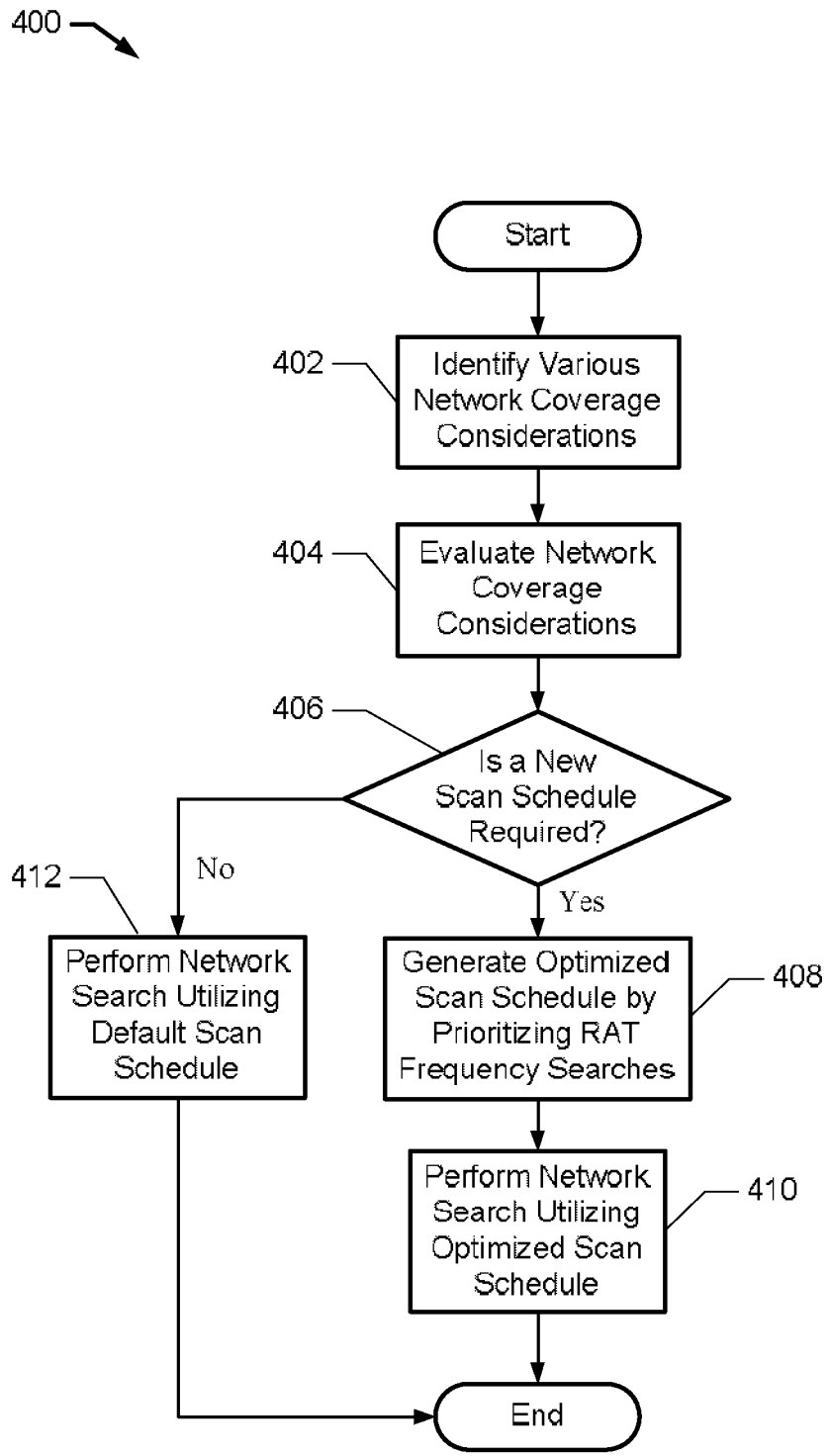
FIG. 4 illustrates a flowchart associated with example methods for evaluating various network coverage considerations in order to generate an optimized scan schedule in accordance with some embodiments.
Figure 5:
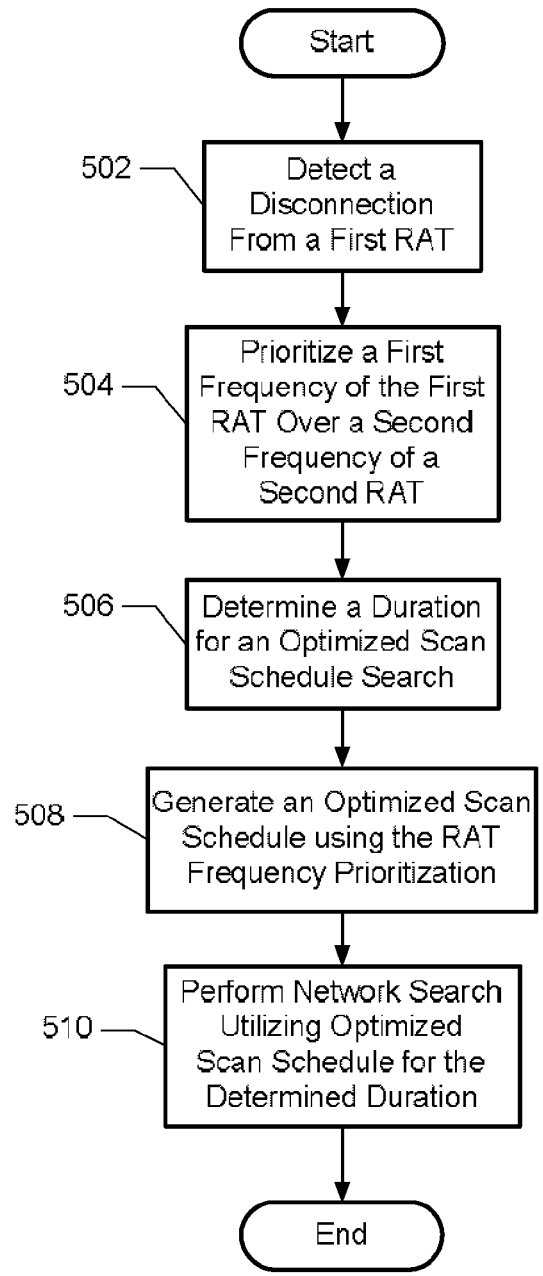
FIG. 5 illustrates a flowchart depicting an example method of network reselection using an optimized scan schedule following a network disconnection event according to certain scenarios described herein.
Figure 9:
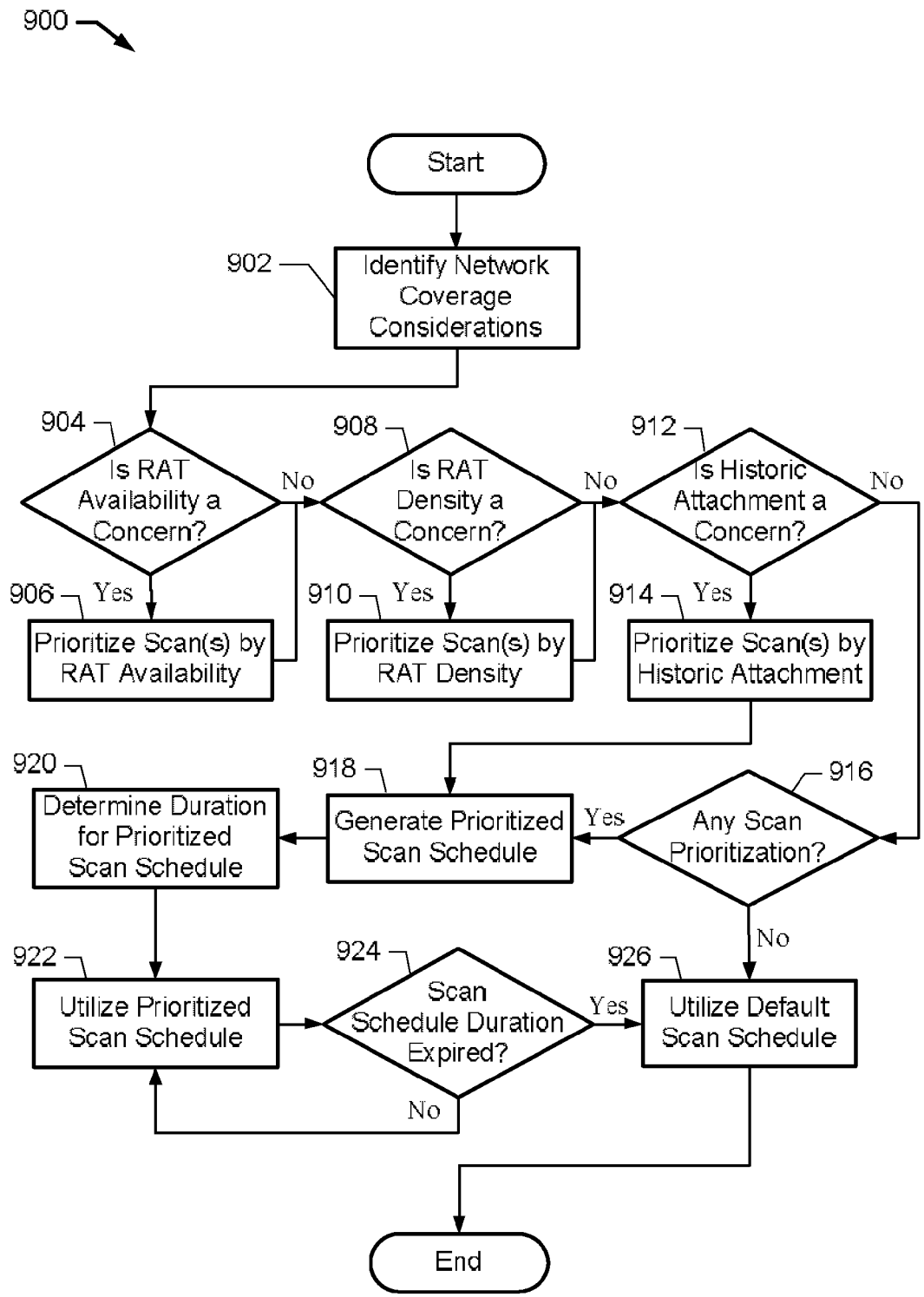
FIG. 9 illustrates a flowchart according to example methods for evaluating certain network coverage considerations to determine how to generate a prioritized scan schedule in accordance with some embodiments.

By way of example, a non-prioritized network search procedure is now described to provide context to the ensuing prioritized network search procedures 400, 500, and 900 respectively depicted in FIGS. 4, 5, and 9, which are described in further detail herein. Notably, network searches employing non-prioritized scan schedules may iteratively loop through available communication modes, e.g., associated with different RAT types, during a network search without accounting for a geographic likelihood of detecting particular RAT networks.

In accordance with a non-prioritized network search procedure for the multi-mode communication device 204, different modes or compliant RATs for the device may be associated with CDMA 2000, GSM, and UMTS. In this scenario, the multi-mode communication device 204 may periodically power-up from a sleep mode or idle mode, in accordance with set RAT timing intervals, to attempt to detect and acquire an available network. During a corresponding wake-up interval, the multi-mode device 204 can search for one or more available CDMA 2000, GSM, or UMTS networks, and in some cases, the multi-mode device 204 can also perform device maintenance activities, e.g., parameter refresh, registration activities, etc.

Initially, the multi-mode communication device 204 may attempt to scan for CDMA 2000 networks based on information resident in the device's Preferred Roaming List (PRL). In some scenarios, CDMA 2000 searches can attempt to detect so-called "pilot" signals" associated with this particular RAT type. The CDMA 2000 pilot signals may be a repeating sequence of signals that are broadcast by a corresponding network base station. If the multi-mode 204 device identifies the presence of a CDMA 2000 pilot signal, the device will proceed to attempt to acquire timing and phase alignment information from the signal. Once the multi-mode communication device 204 has aligned itself to the CDMA 2000 base station, it can further synchronize/fine-tune its timing to that of the base station, receive control signaling information from the base station, and register with the CDMA 2000 network.

However, in a scenario where no CDMA 2000 networks are detected, the multi-mode communication device 204 can attempt to scan for available GSM networks using select Subscriber Identity Module (SIM) information. During the GSM network search, the multi-mode communication device 204 can search for a beacon signal within the corresponding GSM frequency bands. If a GSM beacon signal is detected, the multi-mode device 204 can determine the timing of a GSM base station from a corresponding synchronization channel that periodically broadcasts synchronization information. After the multi-mode communication device 204 has synchronized itself to a GSM base station, it can proceed to decode a Broadcast Control Channel (BCCH), which can provide the multi-mode device 204 with necessary control information for registering with the GSM network.

In a situation where no GSM networks are detected, the multi-mode communication device 204 may attempt to scan for available UMTS networks. During UMTS searches, e.g., when searching for a Wideband Code Division Multiple Access (WCDMA) network, the multi-mode device 204 can perform searches for a Primary Synchronization Sequence (PSS). Once the multi-mode device 204 has located the PSS, the mobile device can identify the frame-timing and limited UMTS base station information from a Secondary Synchronization Sequence (SSS). After the multi-mode communication device 204 has completed its PSS and SSS searches, it can decode the BCCH to obtain necessary control information to perform network registration.

When no UMTS networks are detected, the multi-mode device 204 can iteratively repeat the scans for the CDMA 2000, the GSM, and the UMTS networks over the course of a designated scanning interval according to the same scan schedule. It should be understood that the scanning procedures of non-prioritized network searches are relatively fixed as they are not prioritized according to various network coverage considerations or prioritized according to previous device attachment history.

In contrast, and in accordance with various embodiments described further herein, the multi-mode communication device 204 may employ its scan optimizer 314 after a wake up from a sleep mode or an idle mode operation, to identify and/or evaluate various network coverage considerations, e.g., RAT availability, RAT density within a region, geographic location, historic attachment for the multi-mode communication device, an operation mode of the multi-mode communication device, etc., and then establish different scan frequency priorities for each RAT to which it is compliant. For example, in one embodiment, the multi-mode communication device 204 employing an optimized scan schedule may search for a 2G GSM network twice as frequently as a 3G UMTS/WCDMA network, and four times as frequently as a 4G LTE network, etc.

In another example embodiment, the multi-mode communication device 204 can establish a higher priority for a last-employed network search frequency that is associated with a network to which the multi-mode device 204 was most recently attached. For example, if the multi-mode communication device 204 was last connected to a UMTS/WCDMA network, its scan optimizer 314 may prioritize the WCDMA network for a limited time duration during a network search procedure, such that the 3G WCDMA network is searched for twice as frequently as 2G GSM networks, and four times as frequently as 4G LTE networks, etc. After the limited time duration associated with the optimized scan schedule expires, the multi-mode device 204 may revert to using another scan schedule, e.g., a default scan schedule or a previously-used optimized scan schedule.

FIG. 4 illustrates a flowchart depicting procedures 400 for evaluating various network coverage considerations in order to generate an optimized scan schedule in accordance with some embodiments. It should be understood that any, or all of, the network searching procedures 400 depicted in FIG. 4 may be associated with a method, or methods, that can be implemented by the execution of computer program instructions stored on a non-transitory computer-readable memory 206 of a multi-mode communication device 204, and optionally, in conjunction with the execution of computer program instructions stored on a non-transitory computer-readable memory of a network service provider controlling entity.

Initially, at operation block 402, the multi-mode communication device 204 may identify one or more network coverage considerations that can relate to, but are not limited to, RAT availability, RAT density within a region, geographic location, historic attachment for the multi-mode communication device, an operation mode of the multi-mode communication device, etc., as described above. In various embodiments, the multi-mode communication device 204 may employ the scan optimizer 314 of its network search and acquisition module 312, to evaluate the identified network coverage considerations, at operation block 404. The purpose of this evaluation may be two-fold: for one, the network coverage considerations may be analyzed to determine which RAT frequencies or frequency resources (or frequency bands) should be prioritized over others, prior to generating an optimized scan schedule; for two, the nature of the network coverage considerations may be analyzed in order to determine a limited time duration for performing a prioritized network search based on the optimized scan schedule.

In accordance with some implementations, the nature of the network coverage considerations may be substantially time-sensitive; meaning, the relevance of performing a network search based on a generated optimized scan schedule may only last for finite period of time. This may be the case when an optimized scan schedule is employed to immediately reacquire a lost network. In such a scenario, a network scan prioritizing the disconnected network may be employed for a very short duration, before the network search opts to instead employ an alternative scan schedule (e.g., upon the expiration of a limited time duration) that may better allow the multi-mode device 204 to acquire a network at its particular geographic and network locations.

Then, at decision block 406, the multi-mode communication device 204 may make a determination, e.g., a determination that is based on its evaluations of the network coverage considerations, as to whether a new, optimized scan schedule is required. In a scenario where the multi-mode communication device 204 decides that an optimized scan schedule is NOT required, at decision block 406, the multi-mode device 204 can elect to perform a network search using a default scan schedule at operation block 412.

However, in a scenario where the multi-mode communication device 204 decides that an optimized scan schedule is required, at decision block 406, the multi-mode device 204 can elect to generate an optimized scan schedule, which has one or more prioritized RAT frequencies that will be scanned in a network search at operation block 408. Subsequently, at operation block 410, the multi-mode communication device 204 may utilize the generated, optimized scan schedule to search for one or more RAT frequency resources disproportionately to other RAT frequency resources. For example, in some scenarios, a first RAT frequency or frequency band may be searched more often than a second RAT frequency or frequency band, based on the scan optimizer's 314 evaluations of the network coverage considerations, which were used to generate the optimized scan schedule.

FIG. 5 illustrates a flowchart depicting procedures 500 for network reselection utilizing an optimized scan schedule following a network disconnection event in accordance with some implementations. It should be understood that any, or all of, the network reselection procedures 500 depicted in FIG. 5 may be associated with a method, or methods, that can be implemented by the execution of computer program instructions stored on a non-transitory computer-readable memory 206 of a multi-mode communication device 204, and optionally, in conjunction with the execution of computer program instructions stored on a non-transitory computer-readable memory of a network service provider controlling entity.

Initially, at operation block 502 the multi-mode communication device 204 may detect a disconnection or detachment from a network associated with a first RAT. Subsequently, at operation block 504, the multi-mode device 204 may prioritize a first frequency or frequency band associated with the first RAT over that of a second frequency or frequency band associated with a second RAT. It should be understood that only two RATs are discussed with respect to the network reacquisition procedures 500 for the purposes of clarity and brevity, and that any number of RATs (e.g., a third RAT associated with a third frequency or frequency band) may be employed without departing from the spirit and scope of this disclosure.

Subsequently, at operation block 506, the multi-mode communication device 204 may determine a finite duration for an optimized scan schedule, which will incorporate the RAT frequency prioritizations described with respect to operation block 504. In some implementations, the finite duration corresponds to a portion of a network search that is associated with a period of time when the optimized scan schedule is to be utilized by the multi-mode communication device 204. As described above, the nature of various network coverage considerations may be analyzed in order to determine the finite duration for performing a prioritized network search.

Then, at operation block 508, the multi-mode communication device 204 may elect to generate an optimized scan schedule, which has one or more prioritized RAT frequencies that will be scanned in a network search. Subsequently, at block 510, the multi-mode communication device 204 can utilize the generated, optimized scan schedule to search for one or more RAT frequency resources disproportionately e.g., where the first frequency or frequency band of the first RAT is searched more often that the second frequency or frequency band of the second RAT. In various implementations, the network search employing the optimized scan schedule may be conducted by the multi-mode communication device 204 for only a limited time duration that is associated with the finite duration. After the finite duration has expired, the multi-mode device 204 may employ another prioritized scan schedule, or alternatively, a default scan schedule that may not be prioritized by RAT frequency resources.

Figure 6:
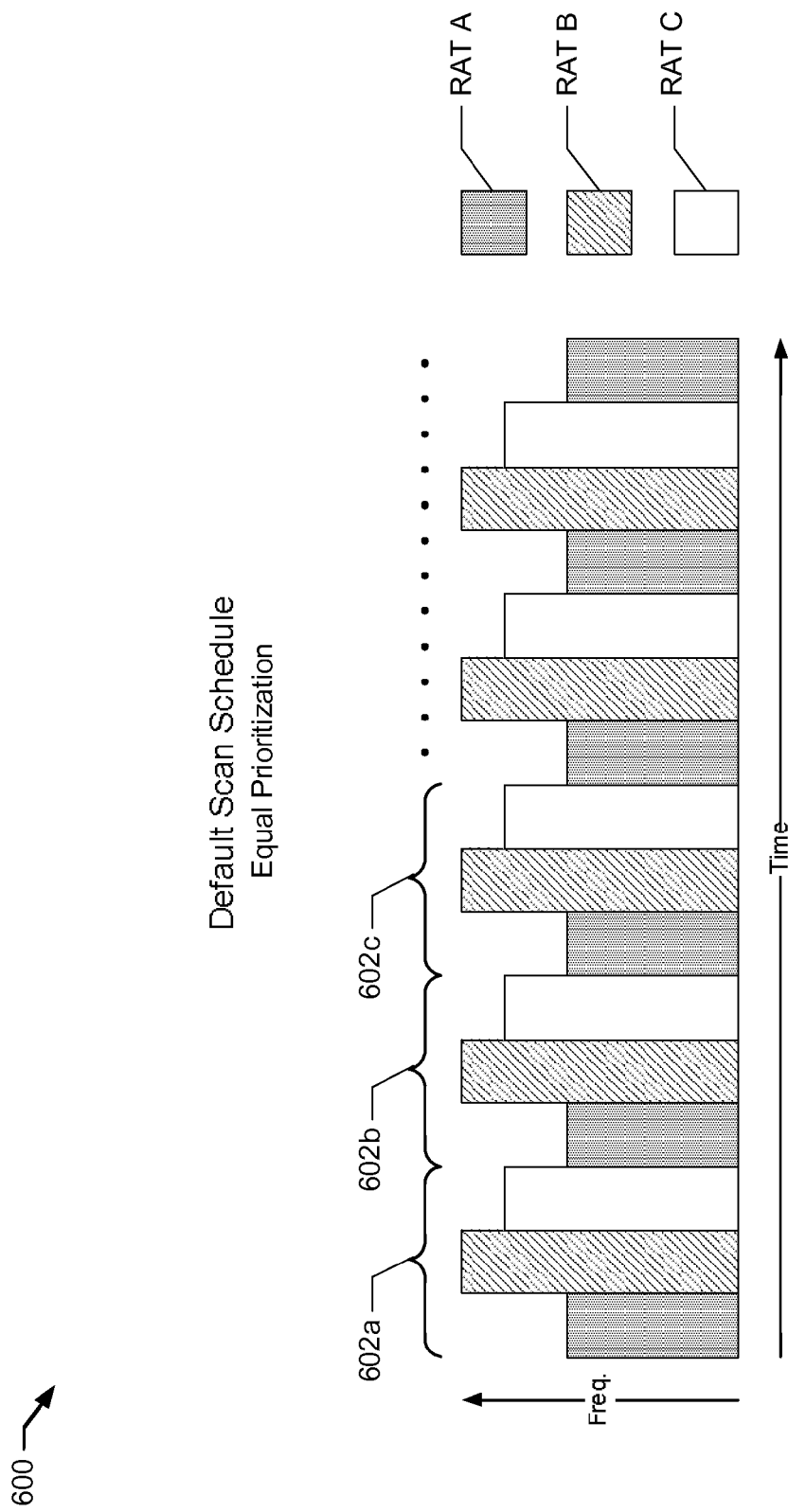
FIG. 6 illustrates a block diagram depicting frequency resource scanning by radio access technology (RAT) type using a default scan schedule according to certain implementations of the disclosure.

FIG. 6 illustrates a block diagram depicting a frequency resource scan timeline 600 that is categorized according to RAT type, and is associated with a non-prioritized, default scan schedule according to certain implementations. In an embodiment, the default scan schedule 600 may identify three different RAT types, RAT A, RAT B, and RAT C, which may respectively correspond to a 4G LTE RAT, a 3G legacy RAT, e.g., UMTS/WCDMA or CDMA 2000, and a 2G legacy RAT, e.g., 2G GSM. In accordance with the default scan schedule 602a-c, the different RATs may receive equal scanning prioritization, such that a frequency or frequency band associated with the LTE RAT, is scanned during a portion/scanning interval of network search just as often as: i) a frequency or frequency band associated with the 3G legacy RAT; and ii) a frequency or frequency band associated with the 2G legacy RAT.

The frequency resources for each RAT type are identifiable by frequency block resource fill/shading. In the frequency resource scan timeline 600, frequencies or frequency bands associated with each of RAT A, RAT B and RAT C, may be sequentially scanned until an appropriate network is detected and acquired by the multi-mode communication device 204. By way of example, during a first iteration 602a, an LTE RAT frequency resource associated with RAT A may be scanned, followed by a scan of a 3G legacy RAT frequency resource associated with RAT B, later followed by a scan of a 2G legacy RAT frequency resource associated with RAT C. In an embodiment, these three scans for each RAT type may occur for an equivalent, finite duration, in accordance with the default scan schedule 600. Subsequently, a second iteration 602b and a third iteration 602c of the default scan schedule, which respectively mirror the scan activity of the first iteration 602a, may be conducted until a corresponding network search is complete.

Figure 7:
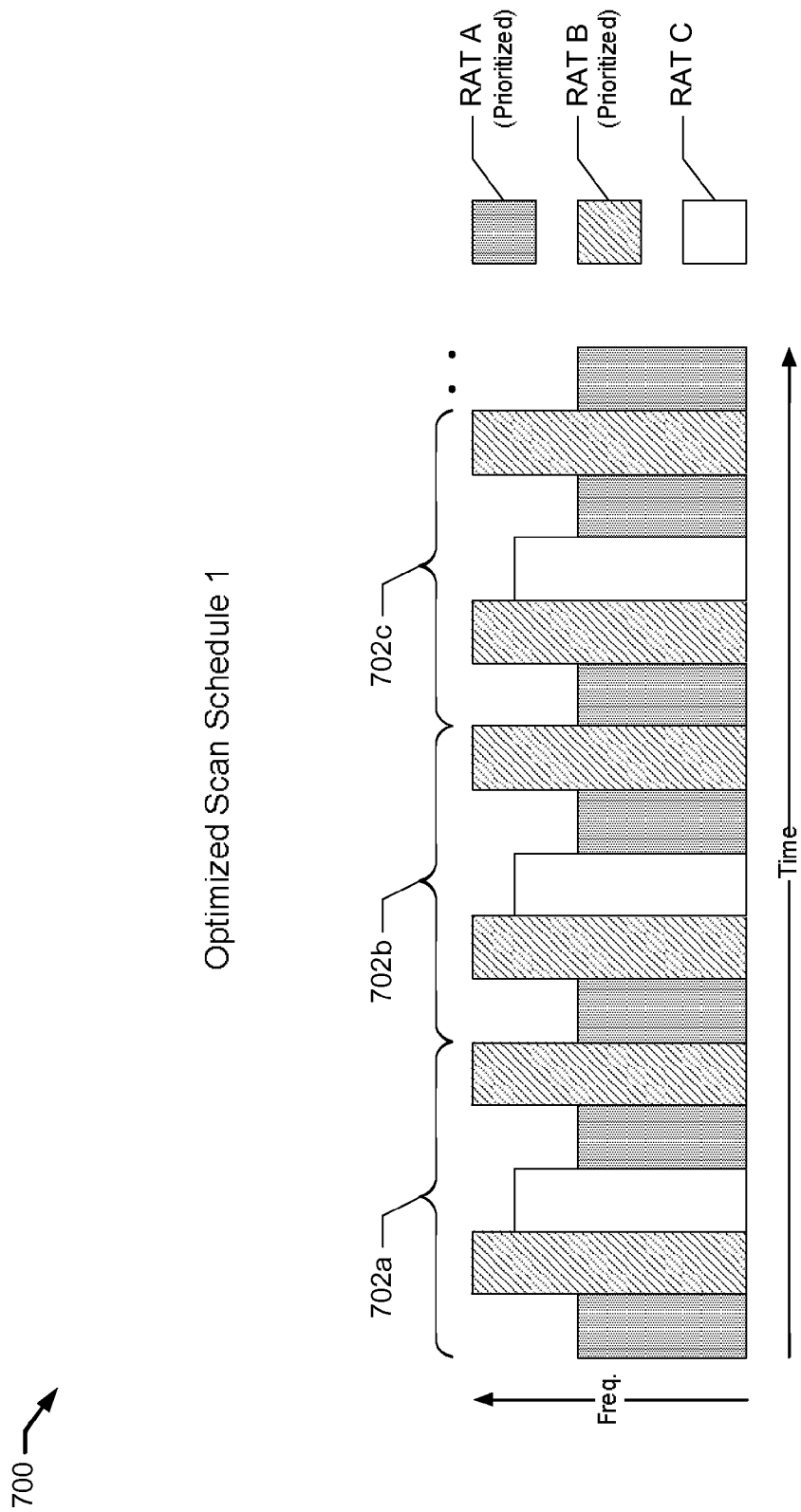
FIG. 7 illustrates a block diagram depicting frequency resource scanning by RAT type using an optimized scan schedule according to one embodiment.

FIG. 7 illustrates a block diagram depicting a frequency resource scan timeline 700 that is categorized according to RAT type, and is associated with a first optimized scan schedule according to some embodiments. Similar to the default scan schedule 600, the first optimized scan schedule 700 may identify three different RAT types, RAT A, RAT B, and RAT C, which may correspond to a 4G LTE RAT, a 3G legacy RAT, e.g., UMTS/WCDMA or CDMA 2000, and a 2G legacy RAT, e.g., 2G GSM. In accordance with the first optimized scan schedule 702a-c, the different RATs may receive different scanning prioritization, such that a frequency or frequency band associated with the LTE RAT, as well as, a frequency or frequency band associated with the 3G legacy RAT are each scanned during a portion/scanning interval of network search twice as often as a frequency or frequency band associated with the 2G legacy RAT.

In the frequency resource scan timeline 700 for the first optimized scan schedule, frequencies or frequency bands associated with each of RAT A, RAT B and RAT C, may be sequentially scanned until an appropriate network is detected and acquired by the multi-mode communication device 204. By way of example, during a first iteration 702a, an LTE RAT frequency resource associated with RAT A may be scanned, followed by a scan of a 3G legacy RAT frequency resource associated with RAT B, followed by a scan of a 2G legacy RAT frequency resource associated with RAT C, followed again by a scan of the frequency resource associated with LTE RAT A, and followed again by a scan of the frequency resource associated with 3G legacy RAT B.

In an embodiment, these five scans for the different RAT types may occur for a finite duration, in accordance with a scanning period of the first optimized scan schedule 700, which effectively prioritizes a search for a network associated with RAT A and RAT B over a network associated with RAT C. Subsequently, a second iteration 702b and a third iteration 702c of the optimized scan schedule, which respectively mirror the scan activity of the first iteration 702a, may be conducted until a corresponding network search is complete.

Figure 8:
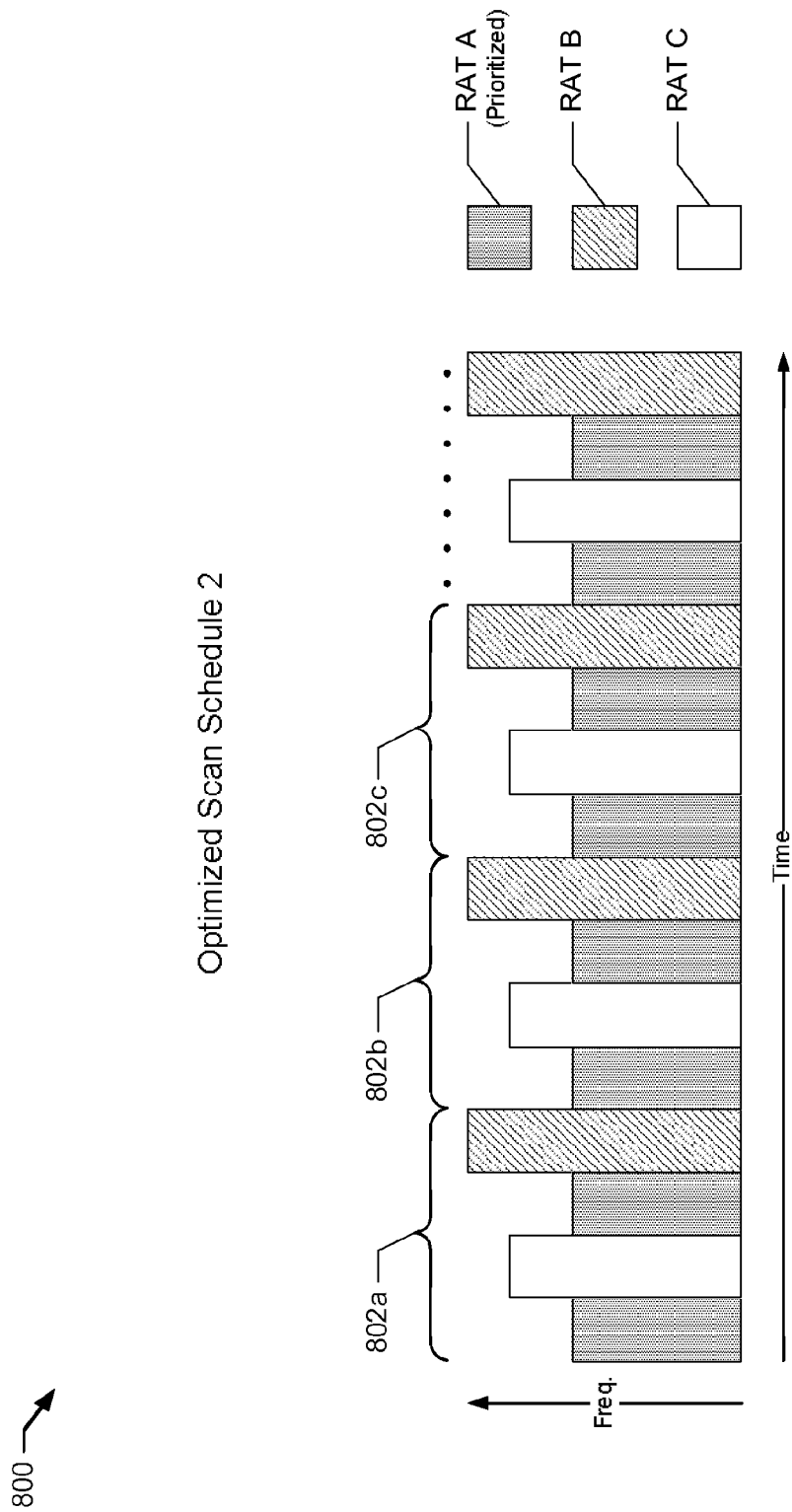
FIG. 8 illustrates a block diagram depicting frequency resource scanning by RAT type using another optimized scan schedule according to one implementation of the disclosure.

FIG. 8 illustrates a block diagram depicting a frequency resource scan timeline 800 that is categorized according to RAT type, and is associated with a second optimized scan schedule according to some scenarios. Similar to the default scan schedule 600 and the first optimized scan schedule 700, the second optimized scan schedule 800 may identify three different RAT types, RAT A, RAT B, and RAT C, which may correspond to a 4G LTE RAT, a 3G legacy RAT, e.g., UMTS/WCDMA or CDMA 2000, and a 2G legacy RAT, e.g., 2G GSM. In accordance with the second optimized scan schedule 802a-c, the different RATs may receive different scanning prioritization, such that a frequency or frequency band associated with the LTE RAT A is scanned during a portion/scanning interval of network search twice as often as: i) a frequency or frequency band associated with the 3G legacy RAT; and ii) a frequency or frequency band associated with the 2G legacy RAT.

In the frequency resource scan timeline 800 for the second optimized scan schedule, frequencies or frequency bands associated with each of RAT A, RAT B and RAT C, may be sequentially scanned until an appropriate network is detected and acquired by the multi-mode communication device 204. By way of example, during a first iteration 802a, an LTE RAT frequency resource associated with RAT A may be scanned, followed by a scan of a 2G legacy RAT frequency resource associated with RAT C, followed by another scan of the LTE RAT frequency resource associated with RAT A, subsequently followed by a scan of a 3G legacy RAT resource associated with RAT B.

In this scenario, the four frequency resource scans for the different RAT types may occur for a finite duration, in accordance with a scanning period of the second optimized scan schedule 800, which effectively prioritizes a search for a network associated with RAT A over networks associated with RAT B and RAT C. Subsequently, a second iteration 802b and a third iteration 802c of the optimized scan schedule, which respectively mirror the scan activity of the first iteration 802a, may be conducted until a corresponding network search is complete.

FIG. 9 illustrates a flowchart depicting procedures 900 for evaluating various network coverage considerations to determine whether to and how to generate a prioritized scan schedule in accordance with some embodiments. It should be appreciated that any, or all of, the procedures 900 depicted in FIG. 9 may be associated with a method, or methods, that can be implemented by the execution of computer program instructions stored on a non-transitory computer-readable memory 206 of a multi-mode communication device 204, and optionally, in conjunction with the execution of computer program instructions stored on a non-transitory computer-readable memory of a network service provider controlling entity.

Initially, at operation block 902, the multi-mode communication device 204 may identify one or more network coverage considerations that can relate to, but are not limited to, RAT availability, RAT density within a region, geographic location, historic attachment for the multi-mode communication device, an operation mode of the multi-mode communication device, etc., as described above. In one embodiment, at decision block 904, the multi-mode communication device 204 may determine if a network coverage consideration associated with RAT availability is a concern. If RAT availability is determined to be a concern, then at operation block 906, the multi-mode communication device 204 can prioritize RAT frequency resource scans according to RAT availability. Then the process proceeds to decision block 908. However, if RAT availability is determined NOT to be a concern, the process proceeds directly to decision block 908.

At decision block 908, the multi-mode communication device 204 can determine if a network coverage consideration associated with RAT density is a concern. If RAT density is determined to be a concern, then at operation block 910, the multi-mode communication device 204 may prioritize RAT frequency resource scans according to RAT density. The process then proceeds to decision block 912. If RAT density is determined NOT to be a concern, then the process proceeds directly to decision block 912.

Subsequently, at decision block 912, the multi-mode communication device 204 can determine if historic network attachments of the multi-mode device 204 are a concern. If historic network attachment is determined to be a concern, then at operation block 914, the multi-mode communication device 204 may prioritize RAT frequency resource scans according to historic network attachments of the multi-mode device 204. The process then proceeds to operation block 918. However, if historic network attachment is determined NOT to be a concern, then the process proceeds to decision block 916 where a determination is made as to whether any additional scan prioritization considerations exist. If additional scan prioritization considerations are present, then the process also proceeds to operation block 918.

However, in a scenario where additional scan prioritization considerations are determined NOT to exist, then at operation block 926 the multi-mode communication device 204 can elect to utilize the default scan schedule, e.g., the default scan schedule 600 of FIG. 6. At operation block 918 the multi-mode communication device 204 may generate a prioritized scan schedule, e.g., either the first or the second optimized scan schedules 700 and 800 of FIGS. 7 and 8. Next, at operation block 920, the multi-mode communication device 204 may determine a duration for the prioritized scan schedule. In some embodiments, the duration for the prioritized scan schedule may be based on a timing relevance of the identified one or more network coverage considerations, e.g., RAT availability, RAT density, or historic attachments of the multi-mode communication device 204. The timing relevance may be related to a known or a predicted period of time when the multi-mode device 204 can expect to detect particular RATs at a specific geographic location or region.

In accordance with some implementations, the nature of the network coverage considerations may be substantially time-sensitive. In particular, the relevance of performing a network search based on a generated prioritized scan schedule may only last for short period of time. In one aspect, the multi-mode communication device 204 can utilize the prioritized scan schedule in association with a first scanning interval that may be associated with a period of time during which the optimized scan schedule is to be employed during a network search. Accordingly, a second scanning interval may be associated with a period of time during which the default scan schedule is to be employed during the network search.

Subsequently, at operation block 922, the multi-mode communication device 204 may utilize the generated, prioritized scan schedule to search for one or more RAT frequency resources disproportionately to other RAT frequency resources. For example, in some scenarios, a first RAT frequency or frequency band may be searched more often than a second RAT frequency or frequency band, based on the scan optimizer's 314 evaluations of the network coverage considerations, e.g., RAT availability, RAT density, or historic attachments of the multi-mode communication device 204, which were used to generate the prioritized scan schedule.

Then at decision block 924, a determination is made as to whether the determined scan duration for the prioritized scan schedule has expired. If the determined scan duration for the prioritized scan schedule has NOT expired, then the process loops back to operation block 922, where the prioritized scan schedule remains utilized by the multi-mode communication device 204 to continue scanning for the one or more preferred RAT(s). When the scan schedule duration associated with the prioritized scan schedule has expired, at decision block 924, the multi-mode communication device 204 reverts to using the default scan schedule at operation block 926 to continue searching for an available network.

In various implementations, it should be understood that network technologies associated with different RAT types are not evenly distributed geographically. For example, within the United States, CDMA2000 and GSM technologies are very popular RATs, whereas within Europe and Asia, GSM, GPRS, EDGE, UMTS are more common. Accordingly, from a coverage perspective, 2G legacy RATS, e.g., GSM, and CDMA 1X, may have better network coverage than 3G legacy RATs, e.g., UMTS/WCDMA and CDMA 2000. Likewise, 2G legacy RATs and 3G legacy RATs may both have better network coverage than 4G LTE RATs. Accordingly, the scan optimizer 314 of the multi-mode communication device 204 should generally be able to prioritize network searches to more often search for frequency resources associated with higher-likelihood RATs. Moreover, in a scenario where a multi-mode communication device 204 loses cellular coverage, e.g., after being registered with a particular network, the multi-mode communication device 204 should be able to reassess its network search priorities, and in some cases, prioritize the previously used RAT over other RATs.

In some embodiments, network search and acquisition procedures can be substantially improved by the scan optimizer 314 of the multi-mode communication device 204 being capable of dynamically changing network search scan frequency prioritization based on various changing network considerations. For example, in one exemplary embodiment, the scan optimizer 314 of the multi-mode communication device 204 may be configured to adjust a relative RAT search periodicity based on historic use, device conditions, user preferences, geographical information, etc. Thus, by dynamically managing network searches, the scan optimizer 314 of the can reduce the amount of time required to search for networks which are unlikely to yield a positive result.

In accordance with some embodiments, the multi-mode communication device 204 may be configured to wake up from a sleep mode and determine its operating mode, e.g., whether the multi-mode communication device 204 is currently in service, e.g., registered with a particular network, or out of service, e.g., in an unregistered mode. In one embodiment, the multi-mode communication device 204 may be configured to verify its current operating status according to one or more predetermined operations or signals. For example, the multi-mode communication device 204 may be configured to search for a broadcast signal such as a pilot signal, a beacon signal, a synchronization signal, etc., in accordance with a particular RAT type.

In other embodiments, the multi-mode communication device 204 may be configured to receive one or more control signals from a network service provider entity or a network base station. In various implementations, the received control signals can include paging signals, paging signal indicators, control channel signals, etc. In other embodiments, the multi-mode communication device 204 may be configured to periodically transmit a "heartbeat" message which indicates to the carrier that the multi-mode communication device 204 is still active.

When the multi-mode communication device 204 is in service, then the multi-mode communication device 204 can employ its scan optimizer 314 to prioritize a most recently-used RAT for a first time duration, in addition to, or in exclusion of other RATs. For example, when the multi-mode communication device 204 was most recently connected to a 4G LTE network, the multi-mode communication device 204 can utilize a corresponding optimized scan schedule to search for LTE cells at approximately the same frequency it uses to search for 2G GSM cells. In this scenario, the multi-mode communication device 204 may search for 3G UMTS/WCDMA or 3G CDMA 2000 networks at interspersed intervals, between its 4G LTE and 2G GSM network searches, e.g., at approximately half the frequency of the LTE and GSM searches.

In some embodiments, a recently used RAT may be prioritized for various reasons, including, but not limited to, the possibility that the complete RAT negotiation need not be repeated, e.g., in a scenario where some of the information or negotiation data related to setting up the prior communication session may have been preserved in device memory, and in order to maintain a continuity of data bandwidth during a communication session e.g., in a scenario where the multi-mode communication device 204 may require use of a high-throughput capable network, such as a 4G LTE network or a robust 3G legacy network, etc.

In some embodiments, the selection of various network scan periods by the scan optimizer 314 can be enhanced with the use of location assistance. In one scenario, the multi-mode communication device 204 can includes a GPS system capable of collecting geographic locational data. In one aspect, the multi-mode communication device 204 may use its GPS coordinate data to determine the relative RAT density of a particular network coverage area based on previous attachment history and other related network information. In some implementations, the multi-mode communication device 204 can be configured to store a running history of the various RATs it has connected to, and the associated GPS location of those RATs. The multi-mode communication device 204 can utilize this historic information to prioritize various network searches, e.g., where most-frequently connected RATs are assigned a higher priority than other lower priority RATs.

In other scenarios, the multi-mode communication device 204 may use the GPS location information to determine when the multi-mode communication device 204 has experienced significant movement, and should therefore spend less time (or conversely, more time) searching for previously attached RATs. In some embodiments, longer distances may be directly correlated to a likelihood of the multi-mode communication device 204 having moved out of the last used RATs coverage area. Further, in some implementations, once the multi-mode communication device 204 has located a serviceable RAT, the multi-mode communication device 204 can attach to the corresponding wireless network and register with its service provider.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method for scheduling a network search for a multi-mode communication device, the method comprising:
   identifying one or more network coverage considerations for the multi-mode communication device;
   generating a prioritized scan schedule including information associated with a plurality of frequency resources to scan during the network search based at least in part on the identified one or more network coverage considerations;
   in accordance with the prioritized scan schedule, scanning a first frequency of the plurality of frequency resources more often than a second frequency of the plurality of frequency resources during a limited duration of a first scanning interval of the network search,
   wherein the first frequency of the plurality of frequency resources is associated with a first radio access technology (RAT) and the second frequency of the plurality of frequency resources is associated with a second RAT;
   in response to determining that the limited duration of the first scanning interval has expired, employing a default scan schedule during a second scanning interval of the network search; and
   in accordance with the default scan schedule, scanning the first frequency of the plurality of frequency resources equally with the second frequency of the plurality of frequency resources during the second scanning interval of the network search.

2. The method of claim 1, wherein the identified one or more network coverage considerations are associated with an operation mode of the multi-mode communication device being in a connected mode, an idle mode, a sleep mode, a registered mode, or an unregistered mode.

3. The method of claim 1, further comprising generating the prioritized scan schedule in response to determining that the multi-mode communication device has disconnected from a wireless network associated with the first RAT,
wherein the multi-mode communication device attempts to reacquire the wireless network associated with the first RAT by prioritizing scanning of the first frequency over other frequencies of the plurality of frequencies resources, including the second frequency.

4. The method of claim 1, further comprising generating the prioritized scan schedule in response to determining that the multi-mode communication device is not registered with a wireless network,
wherein the multi-mode communication device attempts to acquire a wireless network associated with the first RAT by prioritizing scanning of the first frequency over other frequencies of the plurality of frequencies resources, including the second frequency.

5. The method of claim 1, wherein the first RAT is associated with fourth generation (4G) Long Term Evolution (LTE) or LTE Advanced, and wherein the second RAT is a third generation (3G) legacy RAT that is associated with Universal Mobile Telecommunications System (UMTS) or Code Division Multiple Access 2K (CDMA 2000).

6. The method of claim 5, further comprising:
in accordance with the prioritized scan schedule, scanning a third frequency of the plurality of frequency resources more often than the second frequency of the plurality of frequency resources during the first scanning interval of the network search based at least in part on the identified one or more network coverage considerations,
wherein the third frequency of the plurality of frequency resources is associated with a second generation (2G) legacy RAT that is associated with Global Systems for Mobile (GSM).

7. The method of claim 5, further comprising:
in accordance with the prioritized scan schedule, scanning the first frequency of the plurality of frequency resources more often than a third frequency of the plurality of frequency resources during the first scanning interval of the network search based at least in part on the identified one or more network coverage considerations,
wherein the third frequency of the plurality of frequency resources is associated with a second generation (2G) legacy RAT that is associated with Global Systems for Mobile (GSM).

8. A multi-mode communication device comprising:
a one or more transceivers associated with a plurality of radio access technologies (RATs);
processing circuitry coupled to the one or more transceivers; and
at least one memory coupled to the processing circuitry,
wherein the processing circuitry is configured to execute computer program instructions to cause the multi-mode communication device to:
generate a prioritized scan schedule including information associated with a plurality of frequency resources to be scanned during a network search based at least in part on one or more network coverage considerations;
in accordance with the prioritized scan schedule, scan at least two frequencies of the plurality of frequency resources to attempt to acquire a first high priority network associated with a first RAT of the plurality of RATs before a lower priority network associated with a second RAT of the plurality of RATs during a limited duration of a first scanning interval of the network search; and
in response to determining that the limited duration of the first scanning interval has expired, employ a default scan schedule during a second scanning interval of the network search,
wherein employing the default scan schedule causes the multi-mode communication device to scan the at least two frequencies of the plurality of frequency resources equally to attempt to acquire a network associated with any of the plurality of RATs.

9. The multi-mode communication device of claim 8, wherein the scan of the at least two frequencies of the plurality of frequency resources during the limited duration of the first scanning interval scans for the first high priority network associated with the first RAT more often than the lower priority network associated with the second RAT.

10. The multi-mode communication device of claim 8, wherein the limited duration of the first scanning interval of the network search is based at least in part on a relevance of the one or more network coverage considerations.

11. The multi-mode communication device of claim 10, wherein the one or more network coverage considerations are associated with a RAT density within a region, a geographic location, and/or an operational mode of the multi-mode communication device.

12. The multi-mode communication device of claim 8, wherein the first RAT is associated with fourth generation (4G) Long Term Evolution (LTE) or LTE Advanced, and wherein the second RAT is a third generation (3G) legacy RAT that is associated with Universal Mobile Telecommunications System (UMTS) or Code Division Multiple Access 2K (CDMA 2000).

13. The multi-mode communication device of claim 8, wherein the processing circuitry is further configured to execute computer program instructions to cause the multi-mode communication device to:
in accordance with the prioritized scan schedule, scan the at least two frequencies of the plurality of frequency resources to attempt to acquire a second high priority network associated with a third RAT of the plurality of RATs before the lower priority network associated with a second RAT during the network search.

14. The multi-mode communication device of claim 13, wherein the processing circuitry is further configured to execute computer program instructions to cause the multi-mode communication device to:
in accordance with the prioritized scan schedule, scan the at least two frequencies of the plurality of frequency resources to attempt to acquire the first high priority network associated with the first RAT before the second high priority network associated with the third RAT during the network search.

15. A non-transitory computer-readable storage medium storing executable instructions that, when executed by one or more processors of a multi-mode communication device, cause the multi-mode communication device to:
generate a prioritized scan schedule including information associated with a plurality of frequency resources to scan during a network search based at least in part on one or more network coverage considerations;
in accordance with the prioritized scan schedule, scan at least two frequencies of the plurality of frequency resources to attempt to acquire a high priority network associated with a first radio access technology (RAT) of a plurality of RATs before a lower priority network associated with a second RAT of the plurality of RATs during a limited duration of a first scanning interval of the network search; and in response to determining that the limited duration of the first scanning interval has expired, employ a default scan schedule during a second scanning interval of the network search, wherein employing the default scan schedule causes the multi-mode communication device to scan the at least two frequencies of the plurality of frequency resources equally to attempt to acquire a network associated with any of the plurality of RATs.

16. The non-transitory computer-readable storage medium of claim 15, wherein the scan of the at least two frequencies of the plurality of frequency resources during the limited duration of the first scanning interval scans for the high priority network associated with the first RAT more often than the lower priority network associated with the second RAT during the network search.

17. The non-transitory computer-readable storage medium of claim 15, wherein the limited duration of the first scanning interval of the network search is based at least in part on a relevance of an identified one or more network coverage considerations that are associated with a RAT density within a region, a geographic location, and/or an operational mode of the multi-mode communication device.

18. The non-transitory computer-readable storage medium of claim 15, wherein employing the default scan schedule causes the multi-mode communication device to scan the at least two frequencies of the plurality of frequency resources equally to attempt to acquire a network associated with any of the plurality of RATs in an unbiased manner.

\* \* \* \* \*